April 9, 1929.  H. R. HUMPHREY  1,707,982
ELECTRIC HEATER
Filed March 26, 1927   2 Sheets-Sheet 1
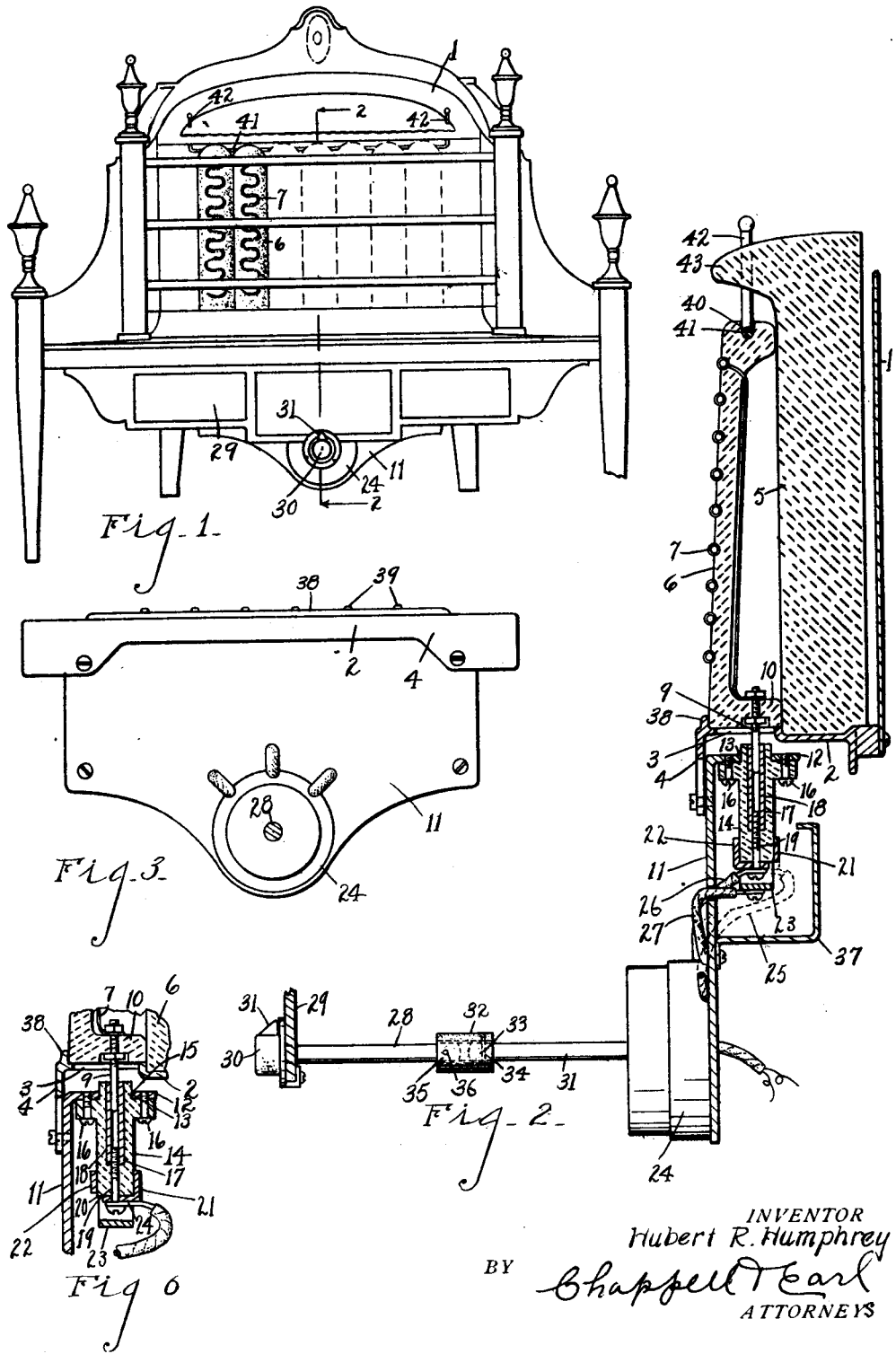
INVENTOR
Hubert R. Humphrey
BY Chappell & Earl
ATTORNEYS April 9, 1929.  H. R. HUMPHREY  1,707,982
ELECTRIC HEATER
Filed March 26, 1927    2 Sheets-Sheet 2
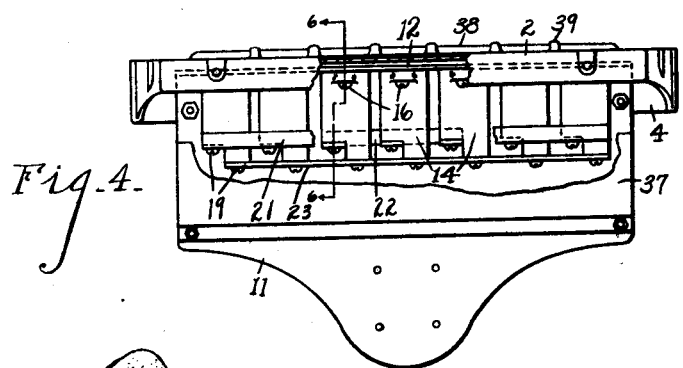
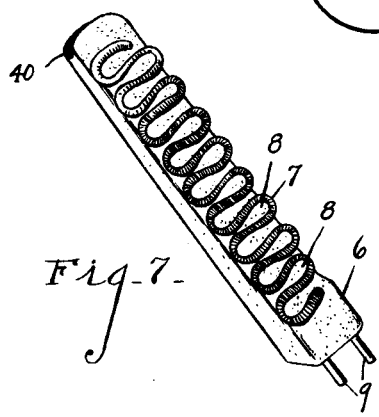
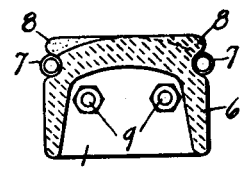
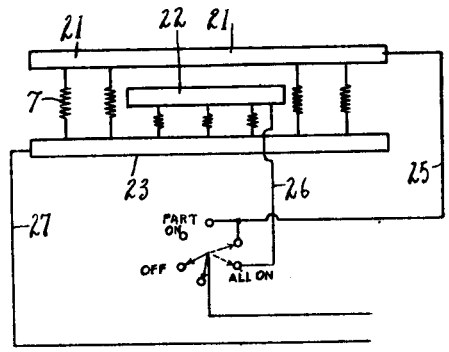
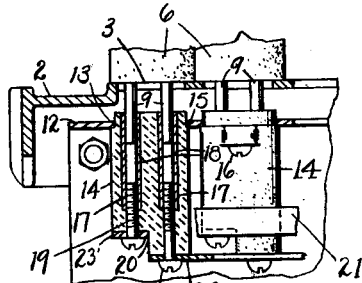
INVENTOR
Hubert R. Humphrey
BY Chappell & Earl
ATTORNEYS Patented Apr. 9, 1929.

1,707,982

UNITED STATES PATENT OFFICE.

HUBERT R. HUMPHREY, OF KALAMAZOO, MICHIGAN, ASSIGNOR TO GENERAL GAS LIGHT COMPANY, OF KALAMAZOO, MICHIGAN.

ELECTRIC HEATER.

Application filed March 26, 1927. Serial No. 178,664.

The main objects of this invention are:

First, to provide an improved electric heater in which the functional parts are simple and economical in structure and may be readily embodied in various types of ornamental casings.

Second, to provide an electric heater which readily adapts itself to production in varying sizes, certain units thereof being adapted for use in any size heater.

Third, to provide an electric heater which is simple and economical in its parts and easily installed as an assembled unit.

Objects relating to details and economies of construction and operation of my invention will appear from the detailed description to follow.

The invention is defined and pointed out in the claims.

A structure which is a preferred embodiment of my invention is illustrated in the accompanying drawing forming a part of this application in which:

Fig. 1 is a front elevation of an electric heater embodying the features of my invention, two only of the heating units being illustrated, the others being indicated conventionally by dotted lines, the structure illustrated being a seven unit heater.

Fig. 2 is a detail section mainly in vertical section on a line corresponding to line 2—2 of Fig. 1.

Fig. 3 is a front elevation of the heating unit supporting base with the electrical unit supports mounted thereon.

Fig. 4 is a fragmentary rear view of the parts shown in Fig. 3.

Fig. 5 is a detail view partially in longitudinal section.

Fig. 6 is a fragmentary transverse section on a line corresponding to line 6—6 of Fig. 4.

Fig. 7 is a perspective view of one of the heating units.

Fig. 8 is a cross section through one of the heating units.

Fig. 9 is a diagrammatic view showing the electrical connections for the heating units.

In the drawing similar reference characters refer to similar parts throughout the several views, and the sectional views are taken looking in the direction of the little arrows at the ends of the section lines.

In the embodiment illustrated in the accompanying drawings, I provide an open front casing designated generally by the numeral 1. However, as the details of this casing form no part of my present invention, I have not detailed the same herein.

This casing is provided with a base plate 2 having openings 3 therein and a downwardly projecting flange 4 at the front thereof. This base plate constitutes a support for the fireback 5 and the heating units which consist of the elongated bodies or holders 6 of earthy material on which the resistance elements 7 are mounted, these holders 6 having lug-like projections 8 arranged in a zig-zag alternating relation. The resistance element as illustrated, is formed of a coil of wire being looped back and forth over these lugs.

The holders are channeled at the rear, pin-like contacts 9 being arranged through the bases 10 thereof, the coil being provided with terminals disposed in the channel of the holders and connected to these contacts so that when the heating units are arranged upon the base plate, as illustrated in Figs. 2 and 5, their contacts project downwardly through the openings 3 in the base plate.

On the downwardly projecting flange at the front of the base plate, I mount a socket member holder 11 having a rearwardly projecting horizontal flange 12 at its upper end, this flange having openings 13 therein aligned with the openings 3 in the base plate.

I provide a plurality of independent socket members 14 preferably formed of insulating material, these socket members being shouldered at 15 to engage the underside of the flange to pass through the openings in the flange and are secured to the underside thereof by the screws 16, laterally projecting ears being provided to receive the screws.

The socket members have vertical shouldered bores 17 therein in which the tubular contacts 18 are arranged to rest upon the shoulders. Binding posts 19 extend into the lower ends of these bores to engage the contacts, retaining them in position and forming an electrical connection therewith. The socket members are preferably shouldered at 20.

The electrical connections to the contacts are formed through the contact headers 21, 22 and 23, the contact headers 21 being provided with lug-like laterals 23' which underlie the shoulders and are engaged by the screws 19. I provide two of the contact headers 21 and 22 in the structure illustrated, so that a part or all of the heating units may be used.

The contact header 23 is arranged against the lower ends of the socket members.

The control switch, designated generally by the numeral 24, has two leads 25 and 26 connected to the contact headers 21 and 22 respectively, the lead 27 being common to all of the contact members. The stem 28 of the switch is carried forwardly through the front plate 29 of the casing and provided with a finger-piece 30 provided with suitable indicator 31.

The stem 28 of the switch is made up of sections connected by a universal joint in the form of a sleeve 32 of insulating material, the return section 33 of the stem projecting into this sleeve and being connected thereto by pin 34, the front section 35 projecting into the sleeve and connected thereto by the pin 36 arranged at right angles to the pin 34. The sleeve is a loose fit so that angular movement of the sections of the sleeve are permitted, thus providing a satisfactory universal joint, and also, the sleeve being formed of insulating material such as fibre, effectively insulates the button 30.

To protect the person installing or handling the heater, I provide an angled guard 37 which is secured on the rear side of the supporting plate to project upwardly at the rear of the socket members embracing their electrical connections.

It will be noted that the base plate is provided with an upwardly projecting flange 38 at the front and with spaced positioning lugs 39 whereby the heating units are accurately positioned relative to the socket or receptacle members.

At their upper ends, the resistance element holders 6 are provided with transverse recesses 40 which are engaged by the retaining rod 41, this retaining rod having upwardly projecting ends 42 arranged through holes in the overhanging flange 43 of the backwall, so that the retaining rod may be lifted up to release the heating units, the same serving, however, to effectively align and support the heating units upon the base plate.

By thus arranging the parts, the resistance element holders 6 being formed of insulating material, the contacts or terminals 9 may be directly mounted thereon, as illustrated, no supporting bases being required for the members 6, and their being made of insulating material, they may rest directly upon the base plate, and being supported at the top, there is no undue strain on the contacts 9 or the holders 6 to which they are directly secured.

The receptacle members may be readily connected in any desired grouping and readily adapted to any number of heating units, that is, the same parts may be embodied in structures, differing only in the matter of size and the number of heating units.

Further, the socket members being formed of porcelain, themselves constitute effective insulators, and forming them as individual units, it is not necessary to allow for shrinkage or variation which ordinarily occurs in material of this character, and the receptacles may be easily applied with the means on the base plate for positioning the heating units.

A further advantage is that the electrical receptacles are mounted on the support 11 and also the switch as a unit, the same unit being adapted for structures of varying ornamentation, that is, the casings may be varied as may be desired for similar sizes of heaters, the electrical units and base plates being standard. Of course, it is necessary to vary the length of the base plates and the supports where the number of heating units are increased or diminished.

The structure is very economical to produce and has wide adaptation.

I have illustrated and described my improvements in a practical embodiment without attempting to show various adaptations which I contemplate as I believe this disclosure will enable those skilled in the art to embody or adapt my improvements as may be desired.

Having thus described my invention, what I claim as new and desire to secure by Letters Patent, is:

1. In an electric heater, the combination of a socket member supporting plate having a rearwardly projecting flange at its upper edge provided with openings, a plurality of socket members of insulating material shouldered to engage said openings in said supporting plate flange and secured to the underside thereof, said socket members having stepped lower ends and shouldered vertical bores, bar-like contact header members disposed on the sides of said socket members and each provided with projecting ears engaging the shoulders of certain of said socket members, a bar-like contact header member disposed on the lower ends of said socket members, tubular contacts arranged in said socket member bores upon their said shoulders, screws arranged through said header members engaging said contacts whereby the header members are electrically connected thereto, and a switch mounted on said supporting plate and operatively connected to said circuit members.

2. In an electric heater, the combination of a socket member supporting plate having a rearwardly projecting flange at its upper edge provided with openings, a plurality of socket members of insulating material shouldered to engage said openings in said supporting plate flange and secured to the underside thereof, said socket members having stepped lower ends and shouldered vertical bores, a contact header member provided with laterals engaging the shoulders of said socket members, a contact header member disposed on the lower ends of said socket members, tubular contacts arranged in said socket member bores upon their said shoulders, screws arranged through said header members engaging said contacts whereby the header members are electrically connected thereto, and a switch mounted on said supporting plate and operatively connected to said circuit members.

3. In an electric heater, the combination of a socket member supporting plate, a plurality of socket members engaging said openings in said supporting plate flange and secured to the underside thereof, said socket members being provided with contacts and having stepped lower ends, contact header members disposed on the sides of said socket members and provided with laterals engaging the shoulders of certain of the said socket members, a contact header member disposed on the lower end of said socket members, and binding posts connecting said header members and contacts.

4. In an electric heater, the combination of a casing provided with a base plate having openings therein, a socket member supporting plate mounted on the underside of said base plate and having openings therein aligned with the openings in said base plate, a plurality of socket members of insulating material mounted in said openings in said supporting plate and provided with pairs of contacts, contact headers mounted on said socket members and connected to their said contacts, and heating units comprising holders having resistance elements mounted thereon removably mounted on said base plate and provided with contacts coacting with said socket member contacts when the heating units are in position on said base plate.

5. In an electric heater, the combination of a casing provided with a base plate having openings therein, a socket member supporting plate mounted on the under side of said base plate and having openings therein aligned with the openings in said base plate, a plurality of socket members of insulating material mounted in said openings in said supporting plate and provided with pairs of contacts, and heating units comprising holders having resistance elements mounted thereon removably mounted on said base plate and provided with contacts coacting with said socket member contacts when the heating units are in position on said base plate.

6. In an electric heater, the combination with a casing provided with a base plate, of a socket supporting member mounted below said base plate, a plurality of socket members mounted on said supporting member, heating units comprising resistance elements of insulating material removably mounted on said base plate and having downwardly projecting contacts engageable with said socket member contacts through said base plate, and resistance elements carried by said holders and connected to their said contacts.

7. In an electric heater, the combination of a casing provided with a base plate, a socket member support mounted below said base plate, a plurality of independent socket members mounted on said support and provided with contacts, heating units comprising resistance element holders, and resistance elements mounted thereon provided with contacts engaging said socket member contacts when said heating units are mounted on said base plate.

8. In a heater, the combination of a casing provided with a base plate having openings therein, socket members mounted below said openings in said base plate and each having pairs of contacts, electric connections for the contacts of the several socket members, a heating unit comprising resistance element holders of insulating material having downwardly projecting contacts removably engaging the socket member contacts when the heating elements are arranged on said base plate above the said openings therein, and resistance elements carried by said resistance element holders and connected to their said contacts.

9. In a heater, the combination of a casing provided with a base plate having openings therein, a plurality of individual socket members mounted below said openings in said base plate, a heating unit comprising resistance element holders of insulating material having downwardly projecting contacts removably engaging the socket member contacts when the heating elements are arranged on said base plate above the said openings therein, and resistance elements carried by said resistance element holders and connected to their said contacts.

10. In an electric heater, the combination of a casing provided with a base plate, a socket member support mounted below said base plate, a socket member mounted on said support and provided with contacts, electrical connections for said socket contacts, a switch for said connections mounted on said supporting member, heating units comprising resistance element holders, and resistance elements mounted thereon provided with contacts engaging said socket member contacts when said heating units are mounted on said base plate.

11. In an electric heater, the combination of a casing provided with a base plate, a socket member support mounted below said base plate, a socket member mounted on said support and provided with contacts, heating units comprising resistance elements holders, and resistance elements mounted thereon provided with contacts engaging said socket member contacts when said heating units are mounted on said base plate.

12. In an electric heater, the combination of a casing provided with a base plate having openings therein and provided with heating unit positioning members, a plurality of electric receptacles of insulating material, a support on which said receptacles are independently mounted, a switch mounted on said support and having electrical connections to said receptacles, said support, receptacles and switch constituting an assembled unit removably mounted on said base plate to support the receptacles in opposed relation to said openings therein, and heating units comprising resistance elements and holders therefor of insulating material having receptacle engaging contacts projecting from their lower ends to engage said receptacles when the heating units are mounted on said base plate and positioned by said positioning members thereof.

13. In an electric heater, the combination of a casing provided with a base plate having openings therein and provided with heating unit positioning members, a plurality of electric receptacles, a support on which said receptacles are mounted, mounted on said base plate to support the receptacles in opposed relation to said openings therein, and heating units comprising resistance elements and holders therefor having receptacle engaging contacts projecting from their lower ends to engage said receptacles when the heating units are mounted on said base plate and positioned by said positioning members thereof.

14. In an electric heater, the combination of a casing provided with a base plate, a plurality of electric receptacles, a support on which said receptacles are independently mounted, a switch mounted on said support and having electrical connections to said receptacles, said support, receptacles and switch constituting an assembled unit removably mounted on said base plate to support the receptacles below said base plate, and heating units comprising resistance elements and holders therefor having receptacle engaging contacts projecting from their lower ends to engage said receptacles when the heating units are mounted on said base plate.

15. In an electric heater, the combination of a casing provided with a base plate having openings therein and provided with heating unit positioning members, electric receptacles mounted below said base plate, heating units comprising resistance elements and holders therefor of insulating material having transverse recesses in their upper ends and receptacle engaging contacts projecting from their lower ends to engage said receptacles when the heating units are mounted on said base plate and positioned by said positioning members thereof, and a retaining rod coacting with said recesses in the upper ends of said heating units.

16. In an electric heater, the combination of a casing provided with a base plate, electric receptacles mounted below said base plate, heating units comprising resistance elements and holders therefor of insulating material having transverse recesses in their upper ends and receptacle engaging contacts projecting from their lower ends to engage said receptacles when the heating units are mounted on said base plate, and a retaining rod coacting with said recesses in the upper ends of said heating units.

17. In an electric heater, the combination of a socket member supporting plate having a rearwardly projecting flange at its upper edge provided with openings, a plurality of socket members of insulating material shouldered to engage said openings in said supporting plate flange and secured to the underside thereof, said socket members having stepped lower ends and shouldered vertical bores, bar-like contact header members disposed on the sides of said socket members and each provided with projecting ears engaging the shoulders of certain of said socket members, a bar-like contact header member disposed on the lower ends of said socket members, tubular contacts arranged in said socket member bores upon their said shoulders, screws arranged through said header members engaging said contacts whereby the header members are electrically connected thereto.

18. In an electric heater, the combination of a socket member supporting plate having a rearwardly projecting flange at its upper edge provided with openings, a plurality of socket members of insulating material shouldered to engage said openings in said supporting plate flange and secured to the underside thereof, said socket members having stepped lower ends and shouldered vertical bores, a contact header member provided with laterals engaging the shoulders of said socket members, a contact header member disposed on the lower ends of said socket members, tubular contacts arranged in said socket member bores upon their said shoulders, screws arranged through said header members engaging said contacts whereby the header members are electrically connected thereto.

In witness whereof I have hereunto set my hand.

HUBERT R. HUMPHREY.